J. C. KENNY.
MARKING ATTACHMENT FOR RAKES.
APPLICATION FILED NOV. 8, 1920.
1,414,087.
Patented Apr. 25, 1922.
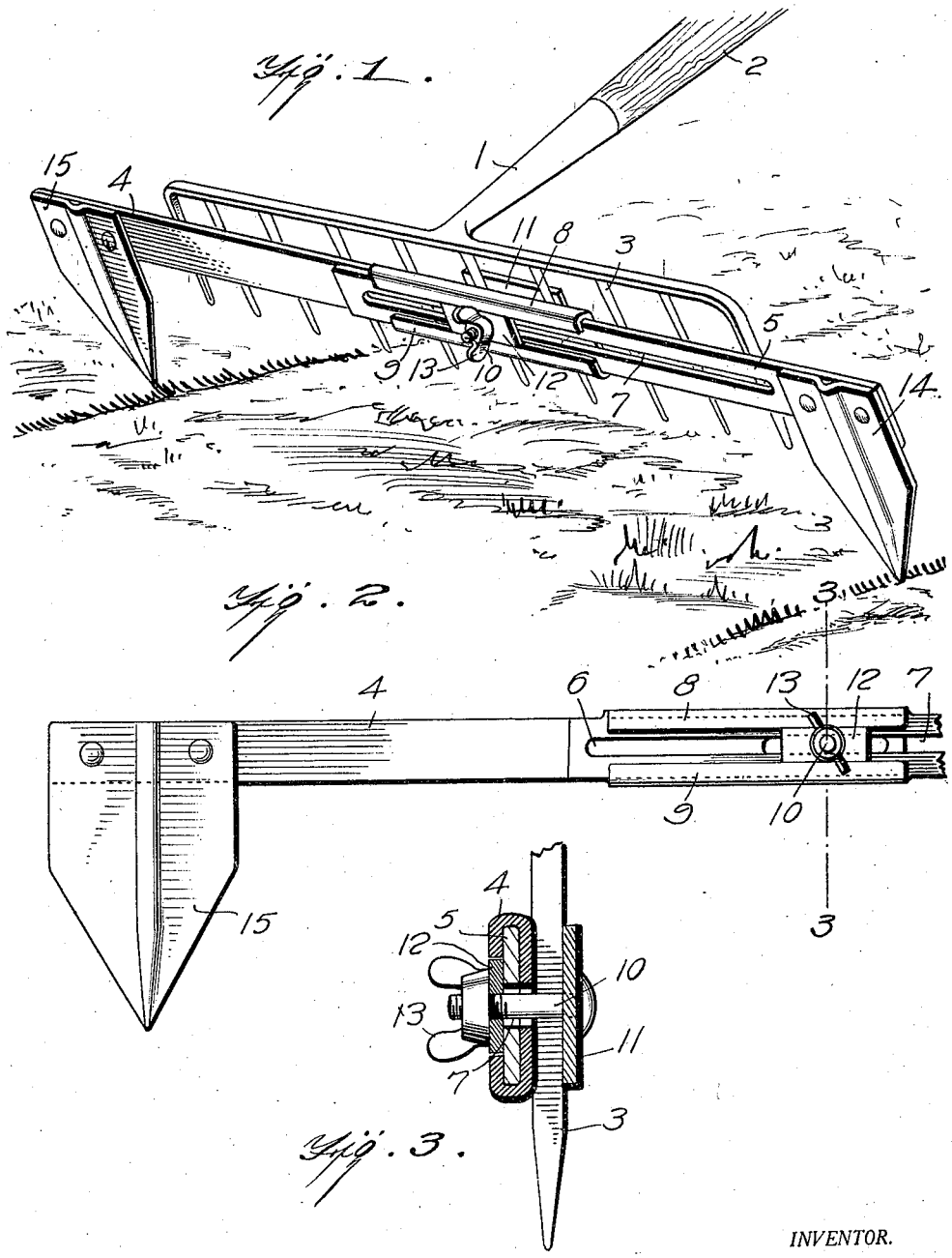
INVENTOR.
JOSEPH C. KENNY,
BY
Franklin H. Hough
ATTORNEY.

UNITED STATES PATENT OFFICE.

JOSEPH C. KENNY, OF WILLIAMSVILLE, NEW YORK.

MARKING ATTACHMENT FOR RAKES.

1,414,087. Specification of Letters Patent. Patented Apr. 25, 1922.

Application filed November 8, 1920. Serial No. 422,607.

*To all whom it may concern:*

Be it known that I, JOSEPH C. KENNY, a citizen of the United States, residing at Williamsville, in the county of Erie and State of New York, have invented certain new and useful Improvements in Marking Attachments for Rakes, of which the following is a specification, reference being had therein to the accompanying drawings.

This invention relates to harrows and diggers, with special reference to marking attachment for rakes.

The principal object of the invention is to provide an implement of the character described so constructed that it may be either used as a rake, weeder or as a marker by means of which plants may be set the proper distance apart.

Another object of the invention is to so construct the marking element that it is easily attached to or detached from the rake, and to further construct this marker blade that the shank thereof may be easily adjusted and firmly but releasably held in its adjusted position.

Still another object is to construct the marking elements of heavy sheet metal, thereby producing a device simple to construct and which is very strong and durable.

The invention is illustrated in the accompanying drawing, in which:

Figure 1 is a perspective view of the improved implement.

Figure 2 is an enlarged fragmentary perspective view of the marking element.

Figure 3 is a sectional view on line 3—3 of Figure 2.

In accordance with this invention a conventional form of rake is indicated at 1 provided with handle 2, and teeth 3 which form or provide attaching means without modification for the marking element consisting of two horizontally disposed bars 4 and 5 which have slots therein indicated by 6 and 7. The bar 4 has its longitudinal edges 8 and 9 bent inwardly to provide guides for the other bar 5. To fasten such device to the rake teeth I make use of a threaded bolt 10 carrying a plate 11 adapted to bridge the interval between and engage two of the teeth 3. A plate 12 of sufficient size to permit its insertion between the guides 8 and 9 forms a bearing for the winged nut 13 by which the marker is securely held to the rake teeth. Marking blades 14 and 15 are carried by the bars 4 and 5, respectively.

It will thus be seen that I have provided a simple and convenient garden tool which makes it unnecessary to carry more than one implement used for this purpose. The novel adjusting and fastening means can be easily manipulated to effect the desired adjustment, and the parts securely held in its adjusted position with slight liability of becoming disengaged, and which is reliable in use, simple in construction and can be cheaply produced.

What is claimed is:

The combination with a rake of a bar extending in parallelism with and along the plane of the teeth and having integral guide flanges at one end, a second bar slidable relative to the first-mentioned bar and positioned within the flanges as guides, a plate upon the side of the teeth opposite the bar, both of said bars being provided with registering slots, a bolt extending through the slots in said bars and said plate and adapted to clamp said bars relative to each other and to the plate and to the teeth, and marking blades carried at the opposite ends of said bars.

In testimony whereof I hereunto affix my signature.

JOSEPH C. KENNY.